May 26, 1942. M. R. HOLSTE Re. 22,101
LIQUID JACKETED AVIATOR'S GARMENT
Original Filed Oct. 6, 1937
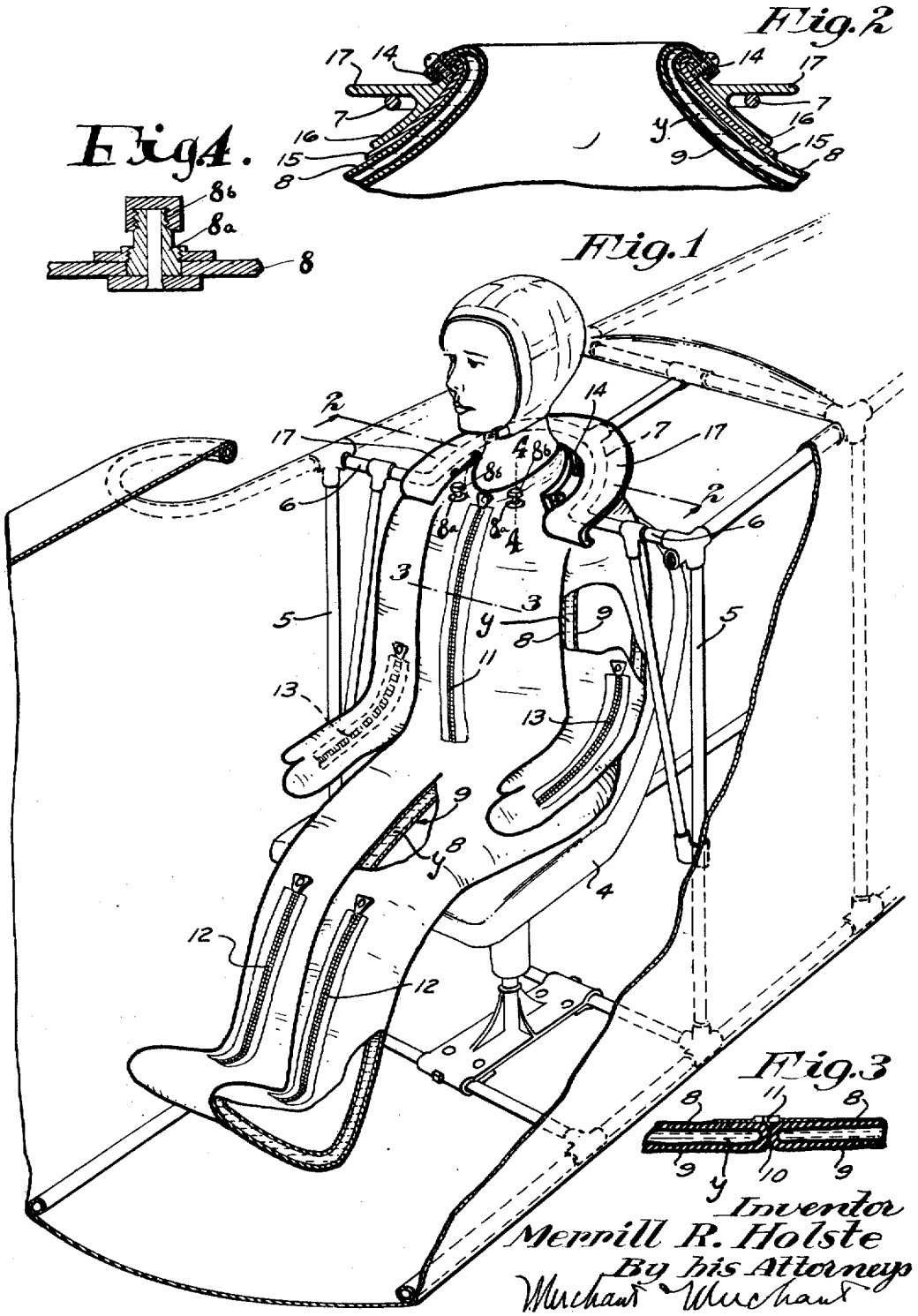

Reissued May 26, 1942

Re. 22,101

UNITED STATES PATENT OFFICE 22,101

LIQUID JACKETED AVIATOR'S GARMENT

Merrill R. Holste, St. Paul, Minn., assignor to United States Rubber Company, New York, N. Y., a corporation of New Jersey Original No. 2,228,115, dated January 7, 1941, Serial No. 167,593, October 6, 1937. Application for reissue December 24, 1941, Serial No. 424,367

13 Claims. (Cl. 128—1)

My present invention relates to a new method of and apparatus for off-setting or counteracting the adverse effects on the human body of unequalized blood pressure in different parts of the body resulting from the rapidly changing conditions of motion. The invention, while adapted for broad use for the purpose specified, is particularly applicable to the aeronautical field, wherein both aeroplane pilots and passengers are often subject to rapid and extreme changes in speed of motion and direction of motion.

It is a known fact that in aviation, especially in high altitudes, when the machine makes a sudden downward or "nose dive" and its downward speed is suddenly checked, the blood in the aviator's body is caused, partly by gravity and partly by centrifugal force, to rush from the head or upper portion of the body into the legs and feet or the lower portion of the body, thereby producing a dizziness frequently approaching and sometimes causing unconsciousness.

The present invention has as an important object the provision of a method whereby the above noted adverse effects produced by the tendency of blood within the human body to rush toward one end or the other of the body under rapidly changing conditions of motion will be greatly reduced or largely eliminated.

Another important object of the invention is the provision of apparatus in the nature of a garment for carrying out the method.

As a preferred apparatus for carrying out the method, I provide an aviator's garment having in addition to the main or torso portion, body and leg portions and usually also arm portions; and the garment is made up of flexible inner and outer wall forming shells spaced to form attenuated or thin chambers that contain water or other liquid that is free for circulation therein.

This improved garment is preferably designed for the use of an aviator or other persons subject to conditions similar to those described and is illustrated in the accompanying drawing wherein like characters indicate like parts throughout the several views.

Broadly stated the method of the present invention consists in confining a portion of the human body, and preferably a major portion of the body, inclusive of legs and torso, within an inelastic garment and providing within this garment a liquid containing chamber adapted to be expanded by the introduction of liquid therein to thereby exert a confining pressure entirely around a substantial portion of the human body. The construction is such that it will exert a confining pressure about and against the exterior of the body, which will be greatest on those portions of the body wherein blood pressure is greatest. In such an arrangement, the tendency of the blood within the body to rush away from one end of the body and to the other end thereof under changing direction or speed of motion will be greatly counteracted by increased external pressure to those portions of the body wherein internal blood pressure is increased.

Referring to the drawing:

Fig. 1 is a perspective with some parts broken away and some parts illustrating the improved garment designed for the purpose stated and seating on the seat and within a frame of fuselage of an airplane;

Fig. 2 is a fragmentary section taken on the line 2—2 of Fig. 1; and

Fig. 3 is a fragmentary section taken on the line 3—3 of Fig. 1.

Fig. 4 is an enlarged detail sectional view taken on the line 4—4 of Fig. 1.

Of the parts of fuselage, it is desirable, for the purposes of this case, particularly to note the seat 4 and the fuselage frame 5 which latter, at its upper portions, is provided above the back of the seat 4, with a cross bar that is formed with an intermediate approximately semi-circular yoke-like portion 7.

The improved garment here illustrated, in its general outlines, resembles very much what is known as a workman's "coveralls" or complete overall. This garment is formed with the body or torso portion, with leg and feet portions and with arms; and all of these portions are formed by outer and inner wall forming shells 8 and 9 both of which are flexible. The inner shell 9 is collapsible and may be of elastic material, but the outer shell should be quite inelastic, although very flexible. The breast or body portion of the garment in the front is slit at 10 as shown in Fig. 3, the adjoining edges of the slit being liquid tight but having fasteners 11 which are preferably of the well-known zipper type. The leg portions of the garment in front are likewise slit or formed with longitudinal openings shown in Fig. 3 and are provided with fasteners such as zippers 12. Also the lower portions of the arms of the garment are likewise slit and provided with fasteners such as zippers 13.

At the upper edge of the garment, the inner and outer shells 8 and 9 are brought together and clamped at 14, to a downwardly flaring metallic yoke pad 15 which in turn is rigidly secured to a similarly formed metallic yoke 16 having a projecting flange 17.

The yoke 16 is adapted to be inserted freely into a bowl of the cross bar, with the flange 17 resting on said cross bar so as to positively hold the upper portion of the garment against downwardly slipping movement on the wearer. In this manner the fluid weighted garment is largely supported independent of the wearer by the frame work of the aeroplane, and this is highly important particularly when making extremely rapid reversals in direction of motion. In case of flying upside down, the yoke 16 will strike the bar 6—7 and act as a stop. The space between the inner and outer walls 8 and 9, respectively is, as previously indicated, filled with a free moving liquid that is heavier than air and which may be assumed to be water *y*. For the purpose of filling the fluid space and venting the said space while filling, the garment is provided in its outer wall with a pair of stems 8*a* that are normally closed by screw threaded caps 8*b*.

In this garment or apparatus it is evident that the pressure of the liquid in the double walled garment will normally be downward and that this pressure will collapse the inner walls and keep the same pressed against the legs and other parts of the body. It is also evident that under sudden retarding of the downward movement, there will be a rush or flow of the liquid to the lower portions of the garment and that this will increase the pressure on the leg and other lower portions of the body, to off-set the tendency of the increase in blood pressure in the same direction. This increased blood pressure, as indicated, will usually be caused by gravity, but it may be produced by centrifugal force, as in turning loops; but in any event it will be off-set by the increased pressure on the body produced by the rush of the liquid in the garment. Usually the garment will be provided with arms and legs, but in some instances, the arms or portions thereof might be omitted. The openings on the arms give the operator a chance to get his hands free from the garment in case they are needed for some work that can not be performed with the mitten portion of the arms on the hands. Preferably the hand receiving portions of the garment are formed like mittens with a separate thumb receiving portion so as to permit free use of the operator's hands for manipulation of control and the zipper fasteners 12 and 13.

What I claim is:

1. In an aeroplane, a body enclosing garment having flexible outer and inner shells, the outer shell being inelastic and the inner shell being inwardly collapsible, said shells being spaced to form an intervening narrow chamber, and a liquid in said chamber capable of free circulation therein, and means for supporting the liquid filled garment from the aeroplane structure so as to relieve a wearer of the weight thereof.

2. The method of off-setting the adverse effects of unequalized blood pressure in different portions of the human body, resulting from rapidly changing conditions of motion, which consists in enclosing a major portion of the body within an elastic confining garment containing a pressure producing free moving liquid that is subject to the same changing conditions of motion as the body blood.

3. The method of off-setting the adverse effects of unequalized blood pressure in different portions of the human body, resulting from rapidly changing conditions of motion, which consists in enclosing a major portion of the body within a body of free moving liquid that is subject to the same changing conditions of motion as the body blood, and will subject different enclosed portions of the human body to external pressure changes in the same direction as the blood pressure changes in corresponding portions of the human body.

4. The method of off-setting the adverse effects of unequalized blood pressure in different portions of the human body, resulting from rapidly changing conditions of motion, which consists in enclosing a major portion of the body within a body of free moving liquid that is subject to the same changing conditions of motion as the body blood, and will subject different enclosed portions of the body to external pressure changes in the same direction as and at an approximately predetermined ratio to blood pressure changes in corresponding portions of the human body.

5. The method of off-setting the adverse effects on the human body of unequalized pressure in different portions of the body, resulting from rapidly changing conditions of motion, which consists in enclosing a major portion of the human body within a surrounding body of free moving liquid having a specific gravity approximating that of the blood within the human body, and subjecting the surrounding liquid to the same changing conditions as the human body.

6. The method of off-setting adverse effects on the human body caused by unequalized blood pressure in different portions of the body, under rapidly changing conditions of motion, which consists in enclosing a major portion of the body, including the legs and torso thereof, within a body of free moving liquid that is subject to the same changing conditions of motion as that of the body blood, whereby when blood tends to rush to one extreme portion or the other of the body, under rapidly changing conditions of motion, the surrounding body of fluid will also tend to rush in the same direction as that of the blood, so that the pressure exerted on the human body by both the blood and the external liquid will be greatest at the same extreme portions of the body and will be least at the same other extreme portion of the body.

7. The method of preventing to a large degree abnormal conditions in the human body caused by rapid changes in motion of the body, which consists in applying a confining pressure about an area of the body by subjecting this area to the pressure of an expansible column of liquid, and subjecting this liquid to a pressure that varies as the rate of body movement varies, to thereby vary the confining pressure upon said area of the body.

8. The combination with an airplane structure, of a garment adapted to be worn by a man while flying in said airplane and constructed to encircle a substantial portion of his body, a liquid containing flexible member secured within said garment and adapted when liquid is confined therein to exert an inwardly pressure upon the surface of the man's body so that this pressure upon the body will increase as the rate of change of the motion of the airplane increases, and means for supporting the liquid weighted garment from the airplane structure so as to relieve the wearer of the weight thereof.

9. The method of preventing to a large degree abnormal conditions in the body of a person in flight caused by rapid changes in motion of the body, which consists on confining a substantial area of the body within a strong garment having therein a yieldingly confined column of liquid whereby an increased inward pressure may be exerted around said area by increasing the pressure of the liquid column, and automatically increasing the inward pressure around this area of the body through the inertia of the liquid caused by said change in motion to thereby reduce the rush of blood to this confined area.

10. The method of preventing to a large degree abnormal conditions in the body of a person in flight caused by rapid changes in motion of the body, which consists in confining a substantial area of the body within a strong garment having therein a yieldingly confined quantity of fluid whereby an increased inward pressure may be exerted around said area by increasing the pressure upon said fluid, and automatically increasing the inward pressure around this area of the body independently of the weight or expanding action of the body by increasing the pressure upon this fluid through inertia caused by said change in motion to thereby reduce the rush of blood to this confined area.

11. The method of preventing to a large degree abnormal conditions in the body of the person in flight caused by rapid changes in motion of the body, which consists in confining the torso and lower limbs of the body in a strong garment having therein a yieldingly confined column of liquid whereby an increased inward pressure may be exerted around said torso and limbs by increasing the pressure of the liquid column, and automatically increasing said inward pressure through the inertia of the liquid caused by said change to thereby reduce the rush of blood to this confined area.

12. The method of preventing to a large degree the tendency of the blood to rush from the head into the body when the human body while in flight is subjected to a rapid change in motion, which consists in entirely encircling a portion of the body and applying a confining pressure exerted by a liquid about this portion of the body, and automatically and rapidly increasing this pressure through the action of inertia as the force that causes the blood to rush from the head becomes substantial to thereby prevent expansion of this portion of the body and exert thereupon a sufficient counter-pressure to reduce the rush of blood to this confined area.

13. The method of preventing to a large degree abnormal conditions in the body of a man in flight caused by rapid changes in motion of the body, which consist in subjecting a substantial area of the body to an encircling confining pressure exerted by a yieldingly confined fluid, and automatically producing on said fluid through the force of gravity and inertia a pressure that increases rapidly as the body undergoes a sudden change in motion to thereby prevent expansion of this portion of the body and exert thereupon a sufficient counter-pressure to reduce the rush of blood to this area.

MERRILL R. HOLSTE.